US012786838B2

(12) United States Patent
Purkayastha et al.

(10) Patent No.: US 12,786,838 B2
(45) Date of Patent: Nov. 3, 2026

(54) CONDITIONAL HANDOVER INCLUDING TARGET MCG AND TARGET SCGS

(71) Applicant: QUALCOMM Incorporated, San Diego, CA (US)

(72) Inventors: Punyaslok Purkayastha, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 18/477,301

(22) Filed: Sep. 28, 2023

(65) Prior Publication Data

US 2024/0114420 A1 Apr. 4, 2024

Related U.S. Application Data

(60) Provisional application No. 63/377,949, filed on Sep. 30, 2022.

(51) Int. Cl.
*H04W 36/36* (2009.01)
*H04W 36/00* (2009.01)

(52) U.S. Cl.
CPC ..... *H04W 36/362* (2023.05); *H04W 36/0069* (2018.08); *H04W 36/00835* (2018.08); *H04W 36/0085* (2018.08)

(58) Field of Classification Search
CPC ... H04W 36/362; H04W 36/36; H04W 36/34; H04W 36/38; H04W 36/385; H04W 36/0058; H04W 36/0055; H04W 36/0061; H04W 36/0064; H04W 36/0066; H04W 36/0077; H04W 36/0072; H04W 36/0005;
(Continued)

(56) References Cited

U.S. PATENT DOCUMENTS 12,206,464 B2 * 1/2025 Matin .................. H04B 17/373
12,520,214 B2 * 1/2026 Xie ....................... H04W 36/24
(Continued)

FOREIGN PATENT DOCUMENTS

WO 2022141470 A1 7/2022

OTHER PUBLICATIONS

International Search Report and Written Opinion—PCT/US2023/034217—ISA/EPO—Jan. 24, 2024.
(Continued)

*Primary Examiner* — Yuwen Pan
*Assistant Examiner* — Samuel H. Leonard
(74) *Attorney, Agent, or Firm* — Procopio, Cory, Hargreaves & Savitch LLP/QUALCOMM

(57) ABSTRACT

A UE receives a conditional handover configuration for a handover to one of multiple candidate target PCells, the conditional handover configuration including multiple candidate target PSCells associated with each candidate target PCell in the conditional handover configuration; perform, in response to a conditional handover execution condition is satisfied, a conditional handover from a source PCell to a target PCell from the multiple candidate target PCells; select a PSCell from the multiple candidate target PSCells configured in the conditional handover configuration for the target PCell, based on a PSCell selection execution condition; and communicate with a network on the target PCell and the selected PSCell.

25 Claims, 10 Drawing Sheets

(58) Field of Classification Search

CPC ............. H04W 36/00; H04W 36/0079; H04W 36/00698; H04W 74/0833; H04W 74/08; H04W 74/00; H04W 36/00692; H04W 36/0069; H04W 36/085; H04W 36/00838; H04W 36/00837; H04W 36/249; H04W 36/302; H04W 74/0838; H04W 84/06; H04W 36/00835; H04W 36/0085; H04W 24/02; H04W 24/08; H04W 36/0016; H04W 36/0027; H04W 36/0033; H04W 36/00725; H04W 36/0088; H04W 36/0094; H04W 36/08; H04W 36/305; H04W 48/02; H04W 72/02; H04W 72/046; H04W 74/006; H04W 74/02; H04W 74/0836; H04W 74/0841; H04W 76/15; H04W 76/19; H04W 76/20; H04W 76/27; H04W 76/28; H04W 76/30; H04W 8/02; H04W 8/20; H04W 88/06; H04W 24/04; H04W 24/10; H04B 7/06952; H04B 7/18541; H04L 5/001; H04L 5/0098; H04L 67/12; H04L 69/40

See application file for complete search history.

(56) References Cited

U.S. PATENT DOCUMENTS

| | | | | |
|---|---|---|---|---|
| 12,520,220 | B2 * | 1/2026 | Xiong | H04W 36/362 |
| 12,543,099 | B2 * | 2/2026 | Bergström | H04W 36/362 |
| 2022/0377631 | A1 * | 11/2022 | Kim | H04W 36/00838 |
| 2023/0217280 | A1 * | 7/2023 | Wallentin | H04W 52/0229 370/252 |
| 2024/0040461 | A1 * | 2/2024 | Da Silva | H04W 36/30 |
| 2024/0073755 | A1 * | 2/2024 | Yan | H04W 36/00835 |
| 2024/0098611 | A1 * | 3/2024 | Da Silva | H04W 24/08 |
| 2024/0121689 | A1 * | 4/2024 | Lim | H04W 76/20 |
| 2024/0340729 | A1 * | 10/2024 | Selvaganapathy | H04W 36/00838 |
| 2025/0261056 | A1 * | 8/2025 | Gürsu | H04W 36/0058 |
| 2025/0317809 | A1 * | 10/2025 | Kim | H04W 36/0085 |
| 2025/0358693 | A1 * | 11/2025 | Conceicao | H04W 36/362 |
| 2025/0392973 | A1 * | 12/2025 | Teyeb | H04W 36/22 |
| 2026/0012874 | A1 * | 1/2026 | Teyeb | H04W 36/362 |
| 2026/0019912 | A1 * | 1/2026 | Qui | H04W 36/362 |
| 2026/0143394 | A1 * | 5/2026 | Leng | H04W 36/08 |

OTHER PUBLICATIONS

Nokia, et al., "CHO With Multiple Candidate SCGs", 3GPP TSG-RAN WG3 Meeting #117, R3-224252, 3rd Generation Partnership Project, Mobile Competence Centre, 650, Route Des Lucioles, F-06921 Sophia-Antipolis Cedex, France, vol. RAN WG3, No. E-meeting, Aug. 15, 2022-Aug. 9, 2022, Aug. 9, 2022, 5 Pages, XP052264420, Para 2 and 2.2.

Nokia, et al., "First thoughts on Conditional Handover with candidate SCGs for CPAC", 3GPP TSG-RAN WG2 Meeting #119 Electronic, R2-2207325, 3rd Generation Partnership Project, Mobile Competence Centre, 650, Route Des Lucioles, F-06921 Sophia-Antipolis Cedex, France, vol. RAN WG2, Elbonia, No. Electronic, Aug. 17, 2022-Aug. 26, 2022, Aug. 10, 2022, 8 Pages, XP052260647.

Qualcomm Incorporated: "CHO with Multiple Candidate SCGs", 3GPP TSG-RAN WG2 Meeting #123, R2-2307785, Type Discussion, 3rd Generation Partnership Project, Mobile Competence Centre, 650, Route Des Lucioles, F-06921 Sophia-Antipolis Cedex, France, vol. 3GPP RAN 2, No. Toulouse, FR, Aug. 21, 2023-Aug. 25, 2023, Aug. 10, 2023, 6 Pages, XP052443496.

Samsung: "Considerations on CHO+CPA/CPC", 3GPP TSG-RAN WG2 Meeting #119-e, R2-2207848, 3rd Generation Partnership Project, Mobile Competence Centre, 650, Route Des Lucioles, F-06921 Sophia-Antipolis Cedex, France, vol. RAN WG2, No. Online, Aug. 17, 2022-Aug. 26, 2022, Aug. 10, 2022, 4 Pages, XP052261165.

ZTE Corporation, et al., "Discussion on CHO with Candidate SCG", 3GPP TSG-RAN WG2 Meeting #119-e, R2-2208411, 3rd Generation Partnership Project, Mobile Competence Centre, 650, Route Des Lucioles, F-06921 Sophia-Antipolis Cedex, France, vol. RAN WG2, No. Online, Aug. 17, 2022-Aug. 26, 2022, Aug. 10, 2022, 7 Pages, XP052261720.

* cited by examiner

Conditional Handover including target MCG and target SCGs

CONDITIONAL HANDOVER INCLUDING TARGET MCG AND TARGET SCGS

CROSS REFERENCE TO RELATED APPLICATION(S)

This application claims the benefit of and priority to U.S. Provisional Application Ser. No. 63/377,949, entitled "Conditional Handover Including Target MCG and Target SCGs" and filed on Sep. 30, 2022, which is expressly incorporated by reference herein in its entirety.

TECHNICAL FIELD

The present disclosure relates generally to communication systems, and more particularly, to wireless communication including a handover between network nodes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus receives a conditional handover configuration for a handover to one of multiple candidate target primary cells (PCells), the conditional handover configuration including multiple candidate target primary secondary cells (PSCells) associated with each candidate target PCell in the conditional handover configuration. The apparatus performs, in response to a conditional handover execution condition being satisfied, a conditional handover from a source PCell to a target PCell from the multiple candidate target PCells and selects a PSCell from the multiple candidate target PSCells configured in the conditional handover configuration for the target PCell, based on a PSCell selection execution condition. The apparatus communicates with a network on the target PCell and the selected PSCell.

In an aspect of the disclosure, a method, a computer-readable medium, and an apparatus are provided for communication at a source primary node (MN). The apparatus provides a request for a conditional handover to at least one target MN including UE measurement information and receives, from each of the at least one target MN, a response indicating multiple candidate target PSCells associated with a candidate target PCell. The apparatus configures a UE with a conditional handover configuration for a handover to one of multiple candidate target PCells and including the multiple candidate target PSCells associated with each candidate target PCell in the conditional handover configuration.

In an aspect of the disclosure, a method, a computer-readable medium, and an apparatus are provided for communication at a target MN. The apparatus receives, from a source MN, a request associated with a conditional handover, the request identifying a candidate target PCell and including UE measurement information; and indicates, to the source MN, multiple candidate target PSCells associated with the candidate target PCell for the conditional handover.

In an aspect of the disclosure, a method, a computer-readable medium, and an apparatus are provided for communication at a target secondary node (SN). The apparatus receives, from a target MN, an additional request associated with a conditional handover for a user equipment; and transmits, to the target MN, a response indicating multiple candidate target PSCells associated with the conditional handover to the target MN.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
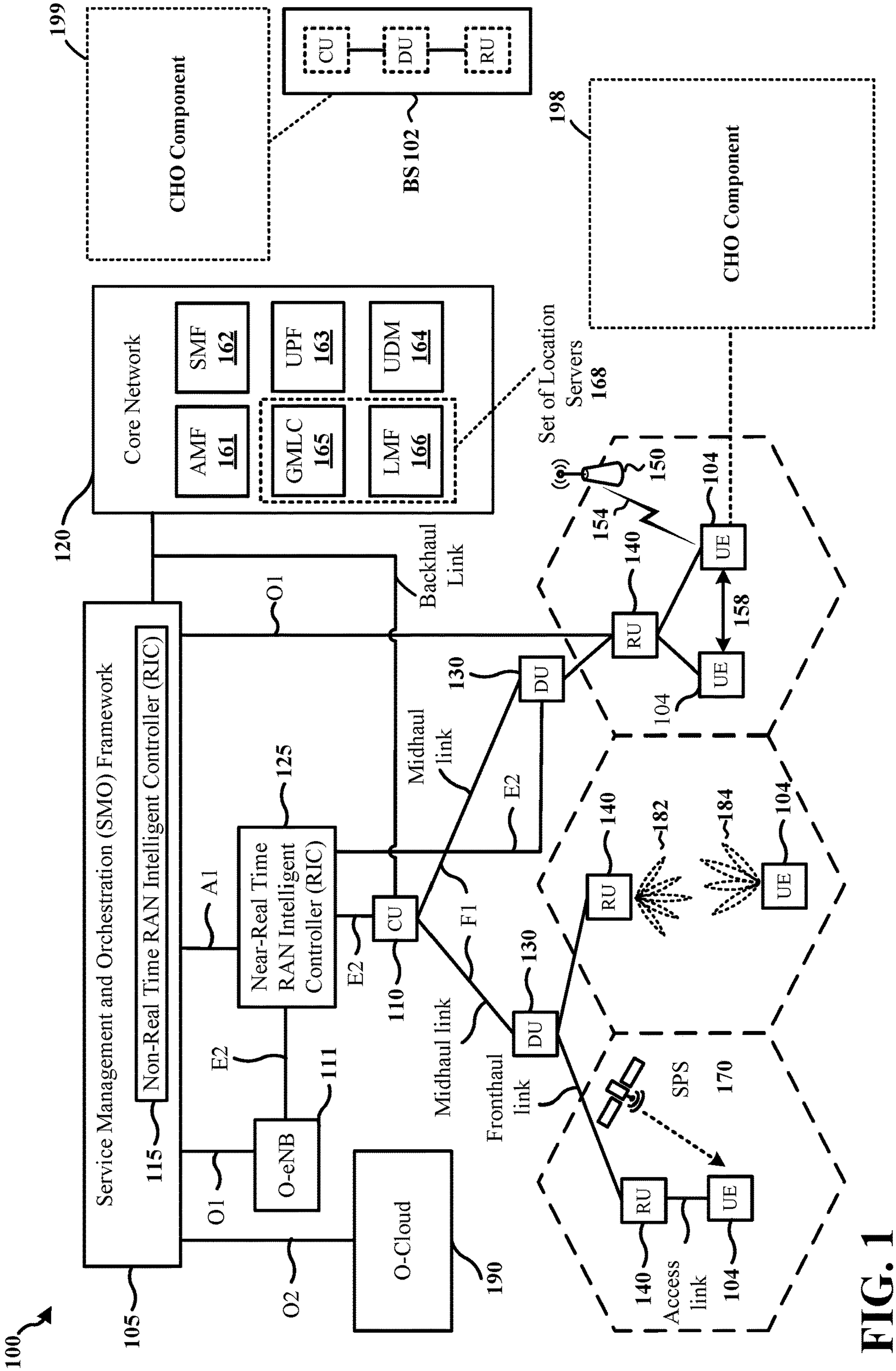
FIG. 1 is a diagram illustrating an example of a wireless communications system and an access network.

Aspects presented herein help to extend the support of conditional handover (CHO) with a multi-radio dual connectivity (MR-DC) configuration in which multiple candidate SCGs may be configured. The radio link quality of the target PSCell in the CHO with MR-DC configuration may no longer be good upon CHO execution. If multiple candidate PSCells are configured, it is more likely for a UE to be able to access a candidate PSCell with a good radio link quality upon CHO execution. Thus, aspects presented herein help to improve mobility for a UE. By increasing the likelihood that a UE will be able to access a candidate PSCell with a good radio link quality upon executing a CHO, aspects presented herein help to provide continuity of service and improve communication between a UE and a network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the 0-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as Al policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Y×MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term “sub-6 GHz” or the like if used herein may broadly represent frequencies that may be less than 6 GHz, may be within FR1, or may include mid-band frequencies. Further, unless specifically stated otherwise, the term “millimeter wave” or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102 UE 104 may perform beam training to determine the best receive and transmit directions for each of the base station 102 UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a CHO component 198 configured to receive a conditional handover configuration for a handover to one of multiple candidate target PCells, the conditional handover configuration including multiple candidate target PSCells associated with each candidate target PCell in the conditional handover configuration; perform, in response to a conditional handover execution condition being satisfied, a conditional handover from a source PCell to a target PCell from the multiple candidate target PCells; and select a PSCell from the multiple candidate target PSCells configured in the conditional handover configuration for the target PCell, based on a PSCell selection execution condition. The UE 104 may be further configured to communicate with a network on the target PCell and the selected PSCell after performing the handover and the PSCell change.

In certain aspects, the base station 102 may include a CHO component 199. In some aspects, such as when the base station 102 is a source MN, the CHO component 199 may be configured to provide a request for a conditional handover to at least one target MN including UE measurement information; receive, from each of the at least one target MN, a response indicating multiple candidate target PSCells associated with a candidate target PCell; and configure a UE with a conditional handover configuration for a handover to one of multiple candidate target PCells and including the multiple candidate target PSCells associated with each candidate target PCell in the conditional handover configuration. In some aspects, such as when the base station 102 is a target MN, the CHO component 199 may be configured to receive, from a source MN, a request associated with a conditional handover, the request identifying a candidate target PCell and including UE measurement information; and indicate, to the source MN, multiple candidate target PSCells associated with the candidate target PCell for the conditional handover. In some aspects, such as when the base station 102 is a target SN, the CHO component 199 may be configured to receive, from a target MN, an additional request associated with a conditional handover for a user equipment; and transmit, to the target MN, a response indicating multiple candidate target PSCells associated with the conditional handover to the target MN. (199). Although the following description may be focused on 5G NR, the concepts described herein may be applicable to other similar areas, such as LTE, LTE-A, CDMA, GSM, and other wireless technologies.

Figure 2A:
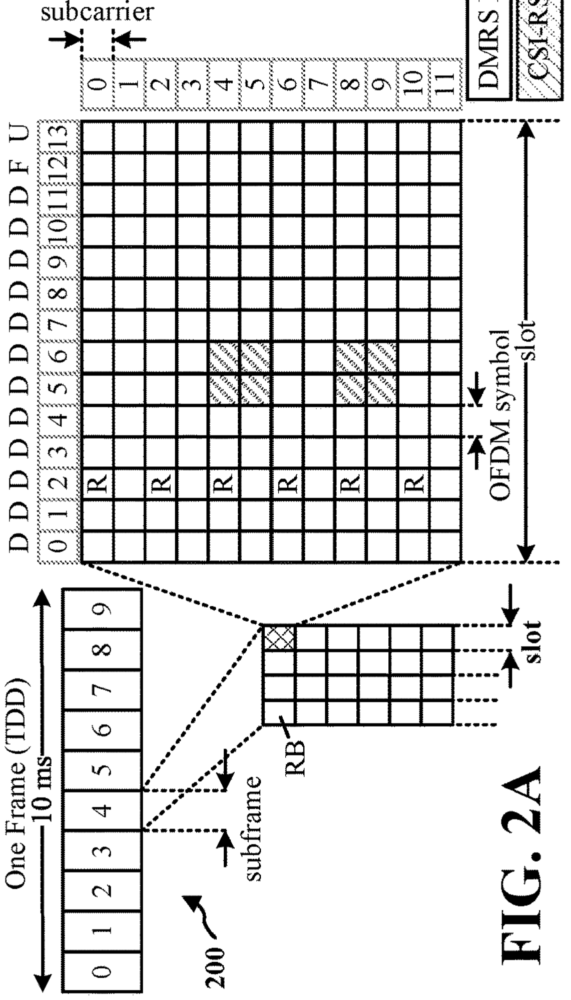
FIG. 2A is a diagram illustrating an example of a first frame, in accordance with various aspects of the present disclosure.
Figure 2B:
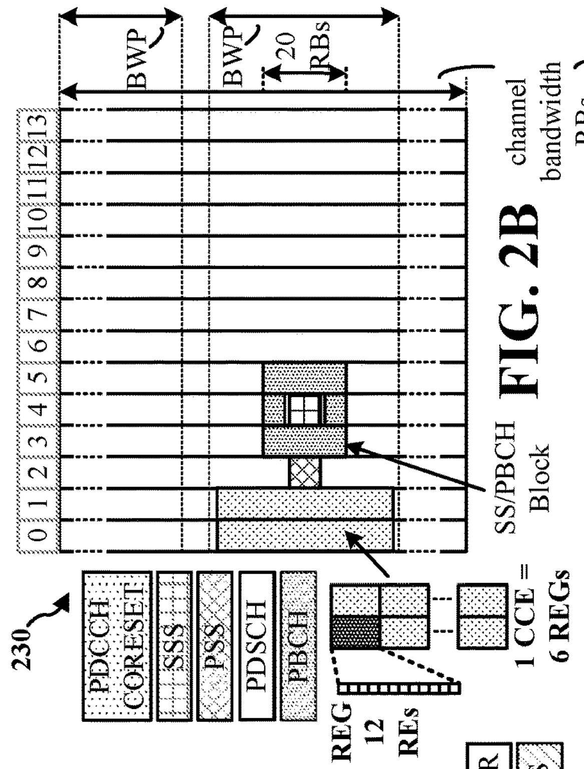
FIG. 2B is a diagram illustrating an example of downlink (DL) channels within a subframe, in accordance with various aspects of the present disclosure.
Figure 2C:
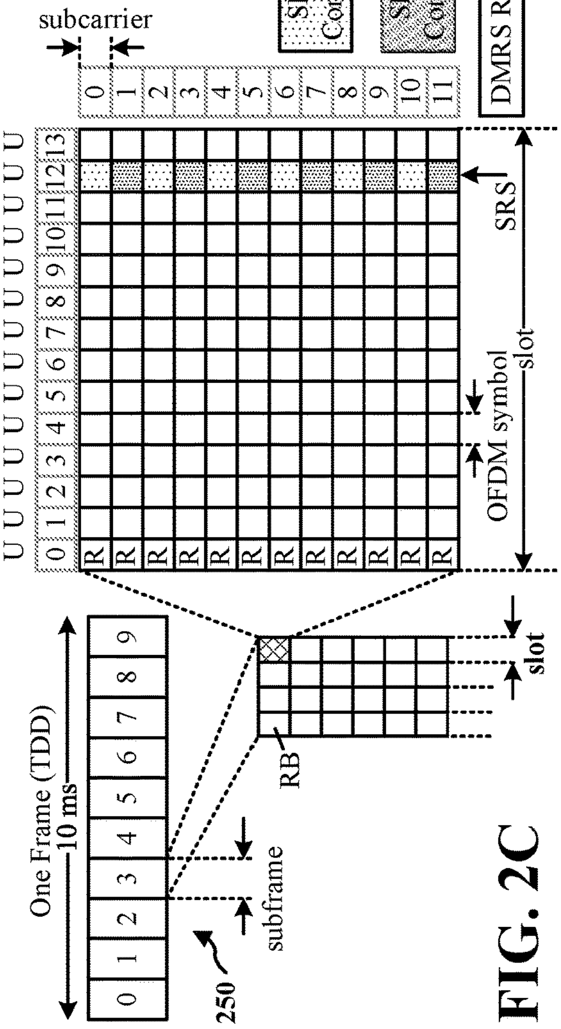
FIG. 2C is a diagram illustrating an example of a second frame, in accordance with various aspects of the present disclosure.
Figure 2D:
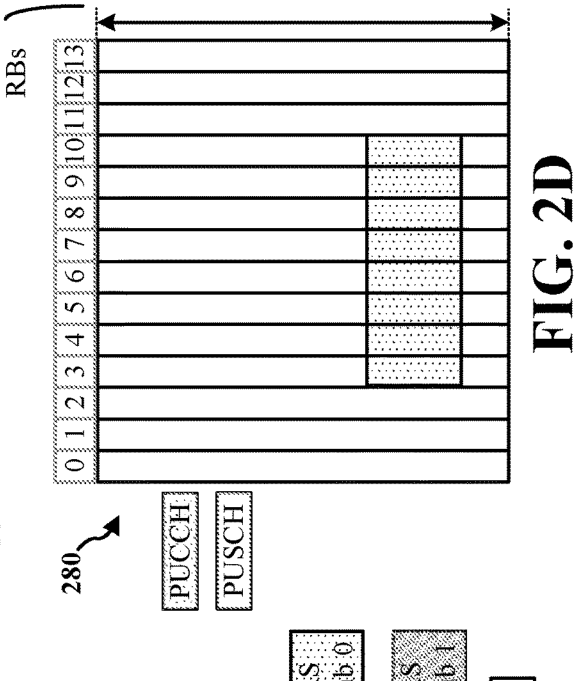
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGs. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
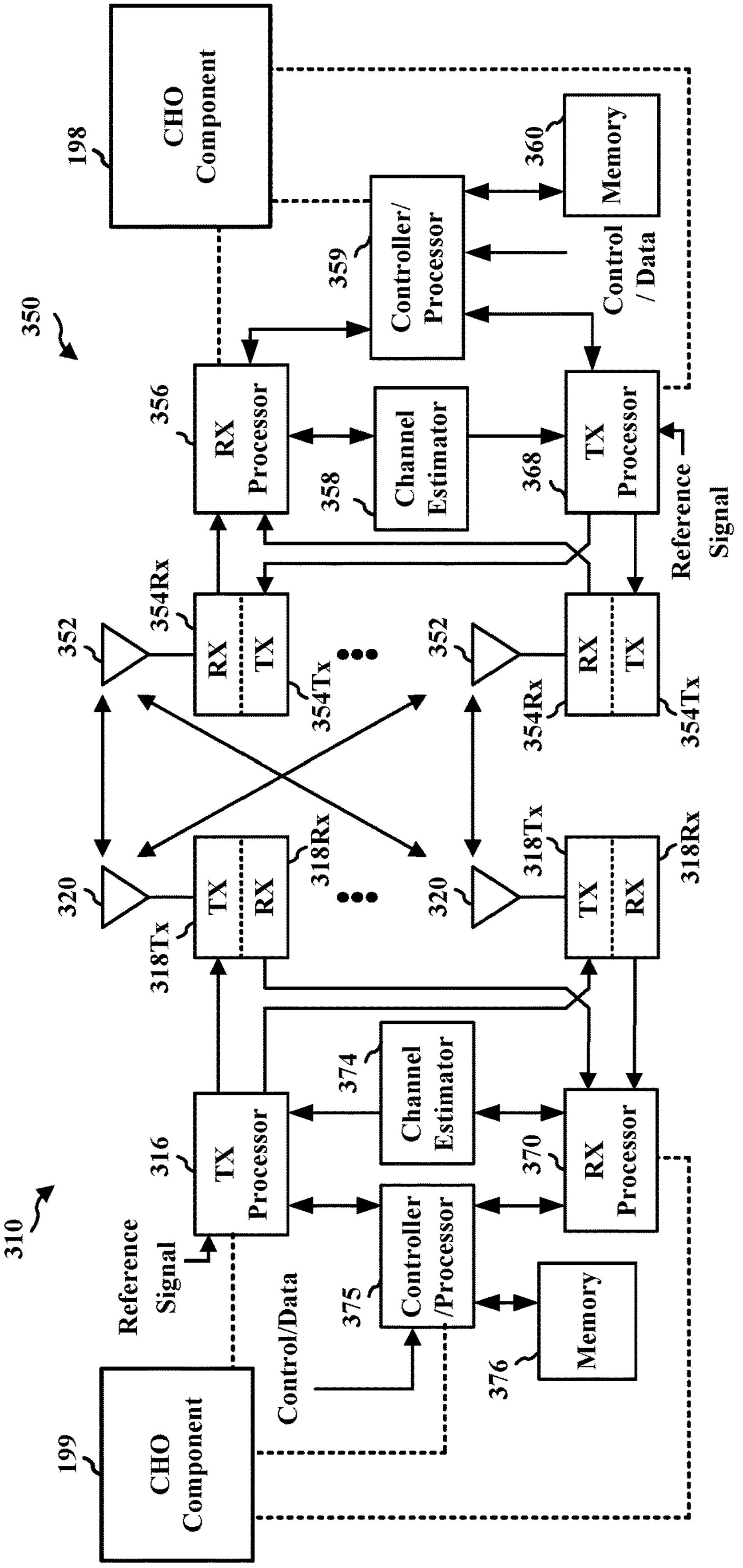
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization. Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 360 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the CHO component 198 of FIG. 1.

At least one of the TX processor 316, the RX processor 370, and the controller/processor 375 may be configured to perform aspects in connection with the CHO component 199 of FIG. 1.

Aspects presented herein help to extend the support of conditional handover CHO with a multi-radio dual connectivity (MR-DC) configuration in which multiple candidate SCGs may be configured. The radio link quality of the target PSCell in the CHO with MR-DC configuration may no longer be good upon CHO execution. If multiple candidate PSCells are configured, it is more likely for a UE to be able to access a candidate PSCell with a good radio link quality upon CHO execution.

Figure 4:
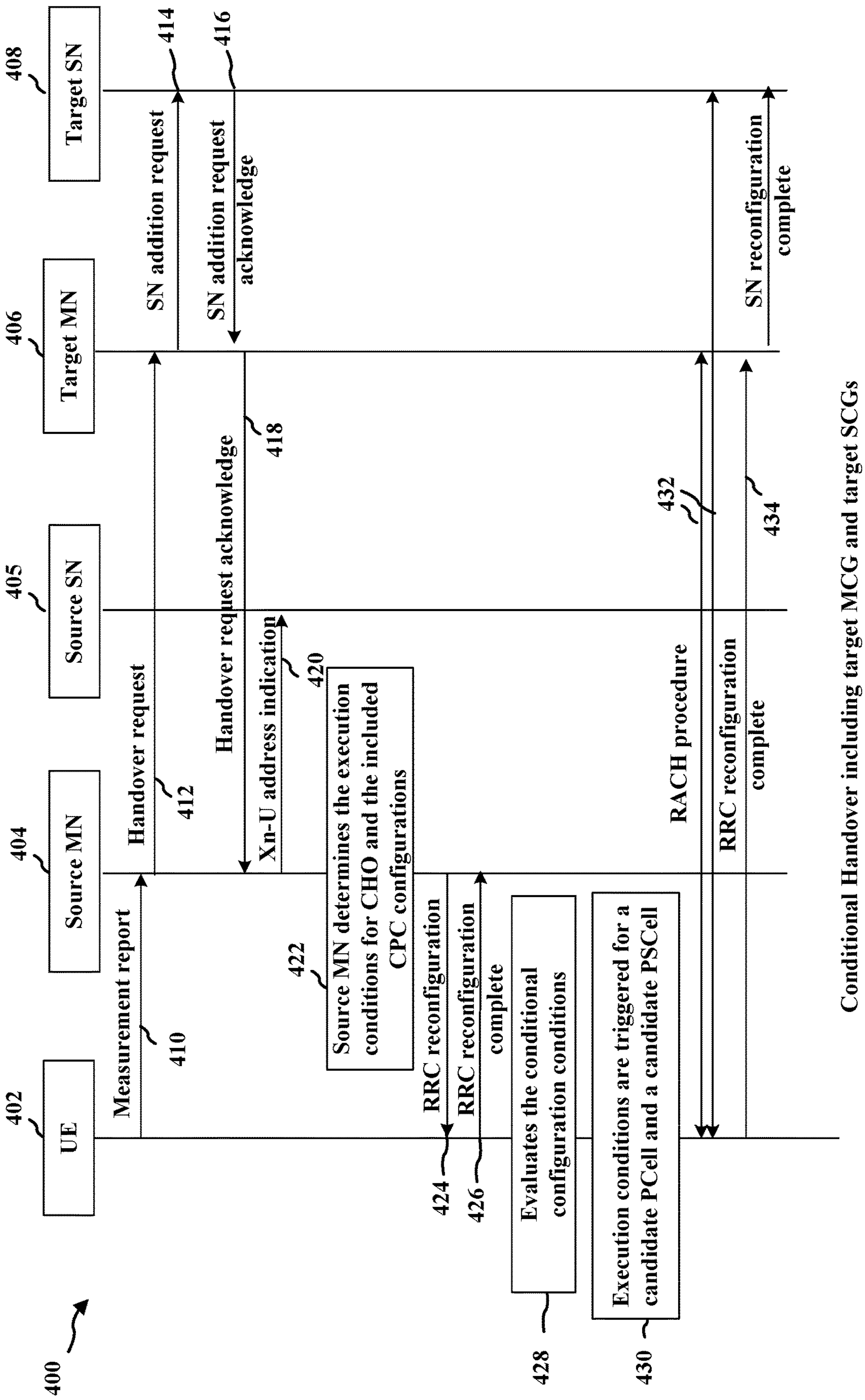
FIG. 4 illustrates a communication flow diagram for a conditional handover in accordance with various aspects of the present disclosure.

FIG. 4 illustrates an example signaling flow 400 between various entities for a CHO procedure. As illustrated at 410, a UE 402 provides a measurement report to a source MN 404 (e.g., a current serving MN). The MN may be referred to herein as a primary node. In some aspects, an MN may be referred to as a master node. The MN may be associated with a primary cell group, e.g., which may be referred to as a master cell group (MCG). The MCG may include a PCell. The SN may be associated with a secondary cell group (SCG), and may include a PSCell. The UE may be configured for communication with the MN 404 and SN 405 (e.g., a source SN).

At 412, the source MN 404 initiates the CHO procedure and transmits a handover request to a target MN 406. The Handover Request message may include any of a source SN UE XnAP ID (e.g., which serves as a reference to the UE context in the SN), a target PCell ID, a CHO indicator (e.g., indicating that a CHO procedure has been initiated), UE measurement results (e.g., based on the measurements reported at 410), and/or source MCG and SCG configurations. The source MN 404 may determine the execution conditions for the CHO configuration (e.g., which may be referred to as conditional handover execution conditions). Although FIG. 4 only illustrates a request sent to a single target MN 406, the source MN 404 may send such requests to multiple target MNs.

Upon receiving the handover request (e.g., 412), a target MN 406 may decide to release the SN (e.g., the SN 405), change the SN (e.g., change to a different SN than 405), or keep the SN (e.g., SN 405). If the target MN 406 decides to change the SN or keep the SN, and furthermore, decides to request a set of target SNs to prepare multiple candidate PSCells, the target MN transmits SN Addition Request to each of one or more target SNs. FIG. 4 illustrates an example request 414 to a single target SN 408 in order to illustrate the concept. Similar requests (e.g., 414) may be sent to multiple target SNs.

The target MN 406 may use the UE measurement results information provided by source MN 404 in the handover request 412 to determine a list of candidate PSCells to suggest to a target SN. The source MN 404 may indicate, to a target MN 406, the maximum number of candidate target PSCells that the target MN can propose to be configured to the target SNs.

Based on the UE measurements results received from the source MN 404, the target MN 406 may send an SN addition request 414 to one or more target SNs 408. The SN addition request may include any combination of: a proposed set of PSCells for the target SN to consider configuring, UE measurement results (e.g., as received by the target MN from the source MN), a conditional PSCell change (CPC) indicator (e.g., indicating that the request is for the conditional evaluation of PSCells), a CHO indicator (e.g., indicating to the target SN that the procedure to configure multiple candidate PSCells is part of a CHO procedure), a source SN UE XnAP ID, and/or a source SCG configuration.

In response to the addition request 414, the target SN 408 may prepare a set of PSCells to acknowledge to the target MN 406. As an example, the target SN may prepare a subset of the proposed PSCells indicated by the target MN 406, and may respond with an SN addition request acknowledge message 416 (e.g., which may also be referred to as an SN addition response message).

A target SN prepares a subset of the proposed set of PSCells indicated by the target MN, and responds with the SN Addition Request Acknowledge message, which may include any combination of a set of prepared (Candidate target) PSCells (which may be a subset of the proposed set indicated in the SN addition request 414), a target SCG configuration associated with each candidate target PSCell, and/or data forwarding addresses for bearers to be moved to the SN (e.g., 408).

The target MN 406 transmits a handover request acknowledge message 418 including the candidate target PCell and the candidate target PSCells provided by the target SNs (e.g., one or more target SNs 408) with which target MN 406 initiated the SN Addition procedure (e.g., through the request 414). The handover request acknowledge message 418 may include the data forwarding addresses for bearers to be moved to the target MN and the target SNs as a result of the conditional handover.

In some aspects, upon receiving handover request acknowledge message 418, source MN 404 may transmit an Xn-U address indication message 420 notifying the CHO to the source SN 405. The source MN 404 may provide the data forwarding addresses including its own addresses and the addresses that the source MN 404 received in the handover request acknowledge message 418 in the Xn-U address indication message 420. The source SN 405 may initiate an early data forwarding upon receiving the Xn-U Address Indication. In some aspects, separate Xn-U Address Indication procedures may be invoked to provide different forwarding addresses of the prepared conditional handovers.

Although, an example is illustrated for a single PCell in order to illustrate the concept, multiple candidate target PCells may be prepared in the CHO procedure initiated by the source MN 404, and each of the candidate target PCells may have an associated set of candidate target PSCells prepared.

Upon receiving the handover request acknowledge message(s) 418 from the target MN(s) 406, the source MN 404 knows about, e.g., has received information from the target MN(s) about, the candidate target PCells and the candidate target PSCells that have been prepared by the target MN(s) 406 and the target SN(s) 408, e.g., as shown at 412, 414, 416, 418, and 420.

The source MN 404 can determine, at 422, the execution conditions (e.g., which may be referred to as PSCell selection execution conditions, PSCell change execution conditions, CPC, etc.) for accessing the multiple candidate target PSCells prepared in the procedure (e.g., as shown at 412, 414, 416, 418, and 420).

The source MN 404 transmits an RRC reconfiguration message 424 (e.g., which may be referred to as an "RRCReconfiguration" message) that includes any combination of candidate target PCells for CHO; execution conditions (e.g., conditional handover execution conditions) for the candidate target PCells; for each candidate target PCell, the set of candidate target PSCells to consider for conditional evaluation; and execution conditions (e.g., PSCell selection execution conditions) associated with the candidate target PSCells, and/or target MCG and SCG configurations associated with the candidate target PCells and candidate target PSCells. In some aspects, the execution condition may be referred to as a PSCell selection execution condition.

The RRC reconfiguration message 424 may include a measurement configuration by the source MN 404, which includes a configuration for the UE to measure the candidate target PCells and/or the candidate target PSCells. The corresponding execution conditions may be indicated with measurement identification information, such as measIDs, that are associated with the measurement configuration provided by the source MN.

The UE 402 may transmit a reply to the RRC reconfiguration message 424, e.g., an RRC reconfiguration complete message 426, to the source MN 404 to acknowledge the provided configuration.

As shown at 428, the UE may evaluate the conditional configuration conditions (e.g., the conditional handover execution conditions for a CHO to a new PCell and/or the PSCell selection execution conditions (which may also be referred to as a PSCell change execution condition or CPC) to select a PSCell associated with a PCell in connection with a CHO). There are various options for UE handling of the conditional configuration evaluation (e.g., as shown at 428 and 430). In some aspects, the UE 402 may begin conditional evaluation of CHO (e.g., evaluating whether CHO execution conditions are satisfied) and CPC (e.g., evaluating whether PSCell selection execution conditions are satisfied) simultaneously. In other aspects, the UE may initiate a conditional evaluation of CHO (e.g., evaluating whether CHO execution conditions are satisfied) prior to initiating the evaluation of the CPC (e.g., evaluating whether PSCell selection execution conditions are satisfied).

If the CHO evaluation is triggered simultaneously with the CPC for a candidate target PCell and an associated candidate target PSCell, the UE 402 may access these cells (e.g., the PCell and associated PSCell) simultaneously.

If the CHO is triggered prior to the CPC (e.g., evaluation of PSCell selection execution condition), the UE 402 may access a candidate target PCell before the candidate target PSCell, and may continue evaluation of the CPC corresponding to this cell (e.g., the target PCell). The UE 402 may then access a candidate target PSCell when the CPC is later triggered (e.g., the PSCell selection execution condition is satisfied).

If the UE is performing simultaneous evaluation, and the CPC evaluation (e.g., PSCell selection execution condition is satisfied) is triggered before the CHO is triggered (e.g., the conditional handover execution condition is satisfied), the UE 402 may not access the candidate target PSCell, because the UE 402 first performs the PCell change. In this circumstance, the UE may continue with CPC evaluation (e.g., of the execution conditions for candidate target PSCells) and CHO evaluation (e.g., of the execution conditions for CHO to a candidate target PCell). The UE waits for a CHO to a PCell to be triggered before making a change based on the CPC (e.g., PSCell evaluation).

If the UE 402 initiates the CPC evaluation (e.g., for the PSCell) after the CHO evaluation is initiated, the CHO evaluation, in some aspects, the UE may initiate the CPC evaluation after a fraction of the time to trigger (TTT) for a CHO evaluation is completed. The TTT corresponds to a continuous period of time during which the execution condition is to be met, after which the CHO is triggered. The fraction of the TTT at which the UE initiates the CPC evaluation can be network configured.

FIG. 4 illustrates that, at 430, the execution conditions for a candidate target PCell and a candidate target PSCell are satisfied, and at 432, the UE 402 performs a RACH procedure with the target MN 406 and the target SN 408, following which, the UE may provide an RRC reconfiguration complete message 434 to the target MN 406, and the target MN 406 may provide an indication to the target SN 408.

Figure 5:
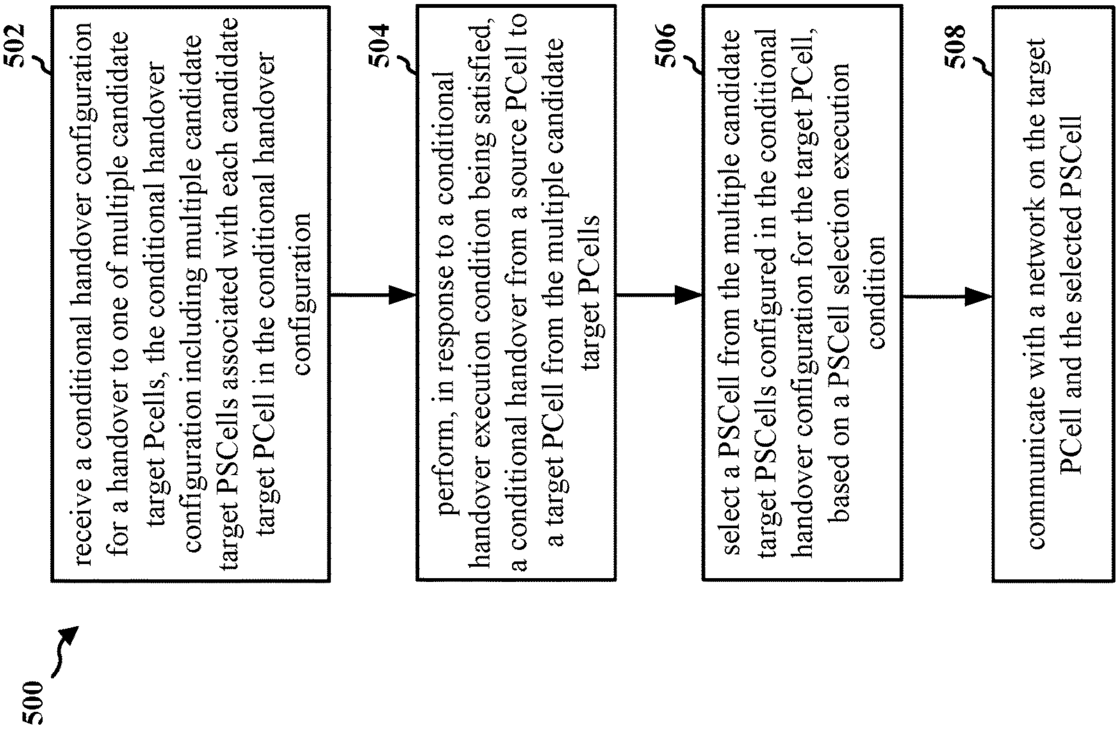
FIG. 5 is a flowchart of a method of wireless communication at a UE in accordance with various aspects of the present disclosure.

FIG. 5 is a flowchart 500 of a method of wireless communication. The method may be performed by a UE (e.g., the UE 104, 350, 402; the apparatus 904). The method may help to improve mobility for a UE by configuring multiple candidate PSCells for a UE, which increases the likelihood that a UE will be able to access a candidate PSCell with a good radio link quality upon executing a CHO. Therefore, the method may help to provide continuity of service and improve communication between a UE and a network.

At 502, the UE receives a conditional handover configuration for a handover to one of multiple candidate target PCells, the conditional handover configuration including multiple candidate target PSCells associated with each candidate target PCell in the conditional handover configuration. FIG. 4 illustrates various aspects of a conditional handover for a UE. The reception may be performed, e.g., by the component 198, the transceiver 922, and/or the antennas 980, for example. The conditional handover configuration may be included in a radio resource control message and indicate one or more of: the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for an MCG and a SCG for each combination of a candidate target PCell and candidate target PSCell, or a combination thereof. The conditional handover configuration may further include a measurement configuration from a source MN, wherein each corresponding PSCell selection execution condition is indicated with a measurement identifier (ID) associated with the measurement configuration from the source MN.

At 504, the UE performs, in response to a conditional handover execution condition being satisfied, a conditional handover from a source PCell to a target PCell from the multiple candidate target PCells. The UE performs the CHO, in response to the previously configured condition being satisfied, e.g., and without additional network signaling instructing the UE to perform the handover, such as without a handover command to handover to the target PCell. The conditional handover may be performed, e.g., by the component 198, for example.

At 506, the UE selects a PSCell from the multiple candidate target PSCells configured in the conditional handover configuration for the target PCell, based on a PSCell selection execution condition. The selection may be performed, e.g., by the component 198, for example.

At 508, the UE communicates with a network on the target PCell and the selected PSCell. The communication may be performed, e.g., by the component 198, the transceiver 922, and/or the antennas 980, for example. For example, the UE may transmit and/or receive communication (e.g., data transmissions) with the target PCell and/or the target PSCell following the conditional handover.

In some aspects, the UE may simultaneously initiate evaluation of conditional handover execution conditions, e.g., to perform the conditional handover at 504, and PSCell selection execution conditions, e.g., to select a PSCell at 506. The UE may access the target PCell and the selected PSCell simultaneously in response to the conditional handover execution condition being satisfied simultaneously with the PSCell selection execution condition. The UE may access, in response to the conditional handover execution condition being satisfied, the target PCell while continuing to evaluate the PSCell selection execution conditions for candidate target PSCells associated with the target PCell. The UE may remain, after the PSCell selection execution condition is satisfied, on the first PCell until the conditional handover execution condition is satisfied.

In some aspects, the UE may initiate a conditional handover execution condition evaluation prior to a PSCell selection execution condition evaluation. The UE may initiate the PSCell selection execution condition evaluation in response to completion of a fraction of a time to trigger (TTT) corresponding to a continuous period of time during which the conditional handover execution condition is to be met for the conditional handover to occur. The conditional handover configuration may indicate the fraction of the TTT, in some aspects. In some aspects, the fraction of the TTT may be selected by the UE.

Figure 6:
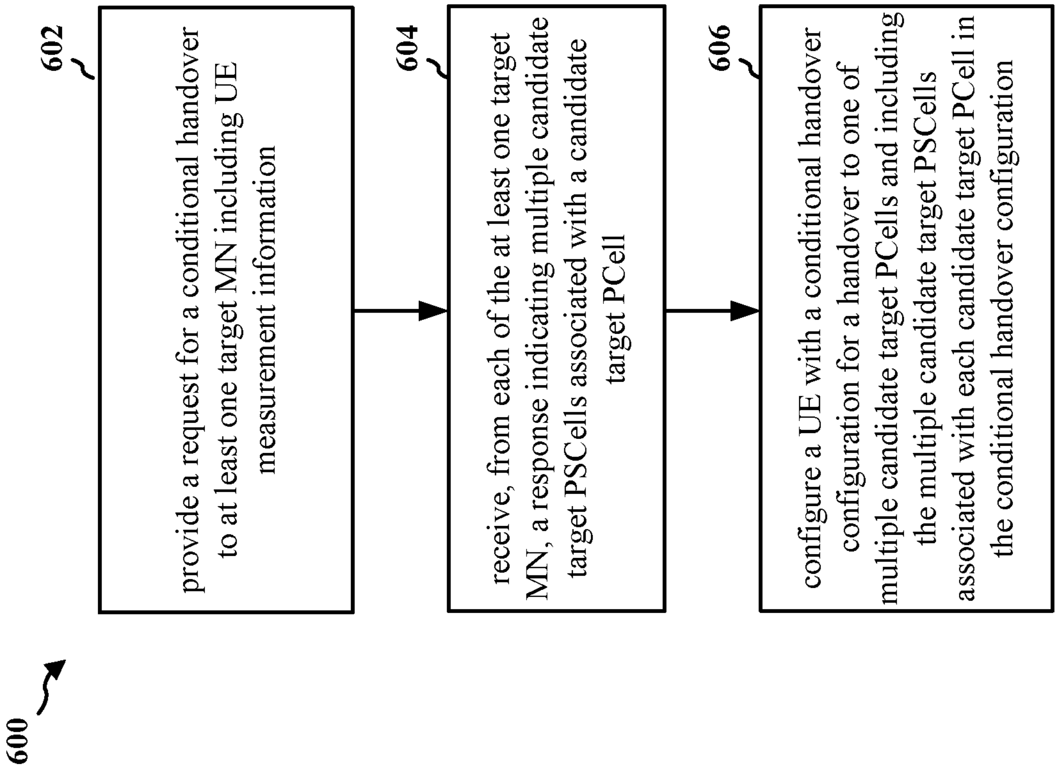
FIG. 6 is a flowchart of a method of wireless communication at a source MN in accordance with various aspects of the present disclosure.

FIG. 6 is a flowchart 600 of a method of wireless communication. The method may be performed by a source MN (e.g., the base station 102, 310; the source MN 404; the network entity 1002). The method may help to improve mobility for a UE served by a wireless network by configuring multiple candidate PSCells for a UE, which increases the likelihood that a UE will be able to access a candidate PSCell with a good radio link quality upon executing a CHO. Therefore, the method may help to provide continuity of service and improve communication between a UE and a network.

At 602, the source MN provides a request for a conditional handover to at least one target MN including UE measurement information. In some aspects, the request from the source MN indicates a maximum number of candidate target PSCells for each of the at least one target MN. FIG. 4 illustrates various aspects of an example conditional handover for a UE. The provision of the request may be performed, e.g., by the component 199, the transceiver 1046, and/or the antennas 1080, for example.

At 604, the source MN receives, from each of the at least one target MN, a response indicating multiple candidate target PSCells associated with a candidate target PCell. The reception may be performed, e.g., by the component 199, the transceiver 1046, and/or the antennas 1080, for example.

At 606, the source MN configures a UE with a conditional handover configuration for a handover to one of multiple candidate target PCells and including the multiple candidate target PSCells associated with each candidate target PCell in the conditional handover configuration. The configuration may be performed, e.g., by the component 199, the transceiver 1046, and/or the antennas 1080, for example. The conditional handover configuration may be included in a radio resource control message and indicate one or more of: the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, or a target configuration for a primary cell group (MCG) and a secondary cell group (SCG) for each combination of a candidate target PCell and candidate target PSCell. The conditional handover configuration may further include a measurement configuration from a source primary node (MN), wherein each corresponding PSCell selection execution condition is indicated with a measurement identifier (ID) associated with the measurement configuration from the source MN.

Figure 7B:
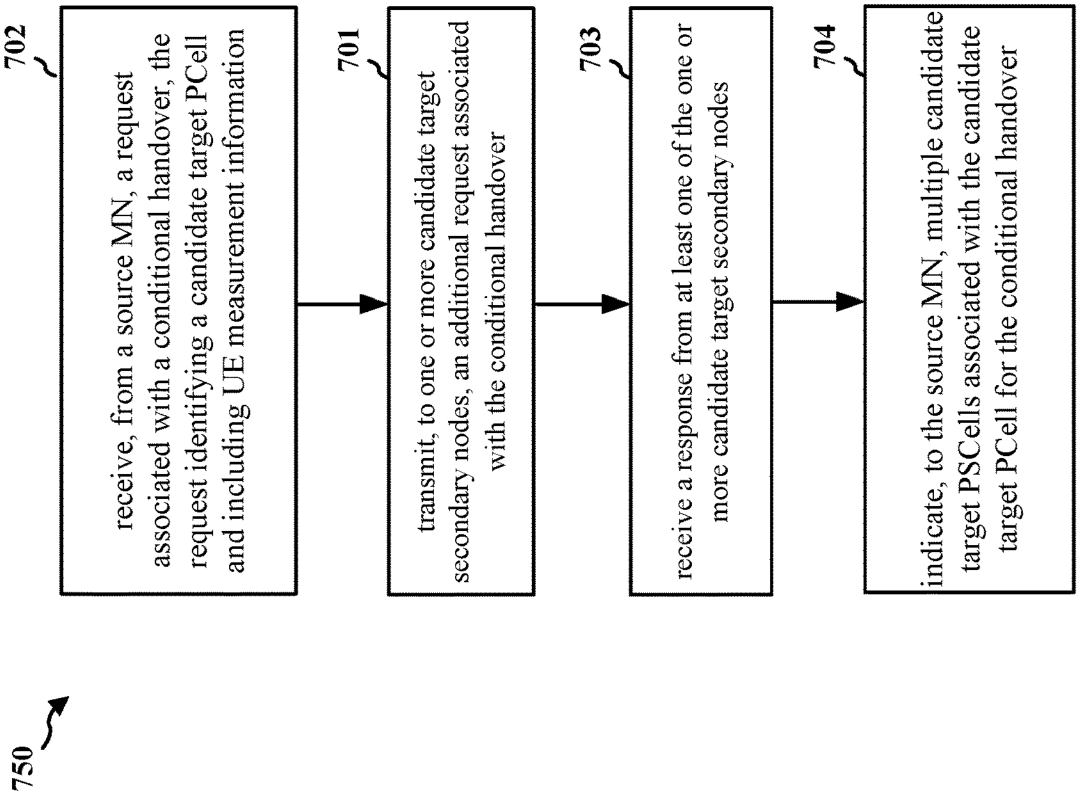
FIG. 7A and FIG. 7B are flowcharts of methods of wireless communication at a target MN in accordance with various aspects of the present disclosure.
Figure 7A:
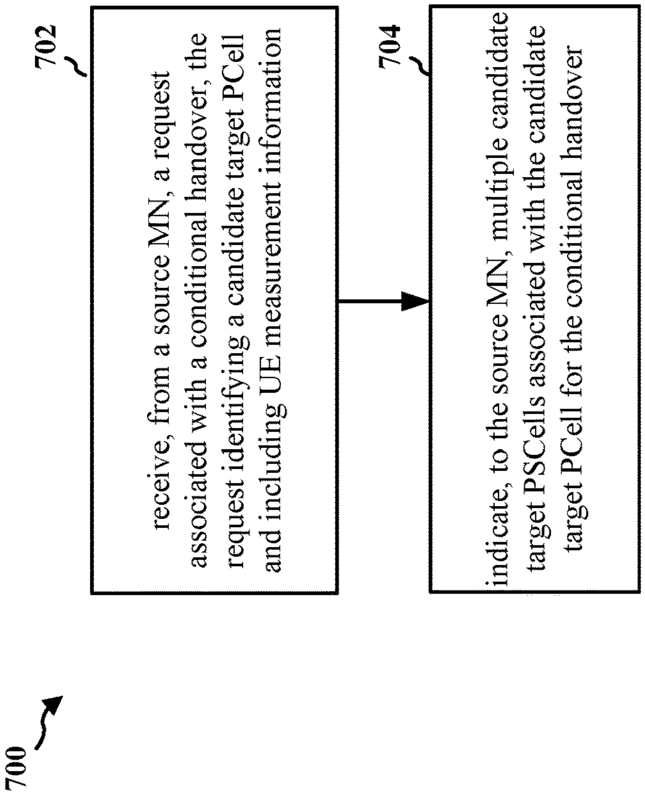

FIG. 7A is a flowchart 700 of a method of wireless communication. The method may be performed by a network node (e.g., the base station 102, 310; the target MN 406; the network entity 1002). The method may help to improve mobility for a UE served by a wireless network by configuring multiple candidate PSCells for a UE, which increases the likelihood that a UE will be able to access a candidate PSCell with a good radio link quality upon executing a CHO. Therefore, the method may help to provide continuity of service and improve communication between a UE and a network.

At 702, the target MN receives, from a source MN, a request associated with a conditional handover, the request identifying a candidate target PCell and including UE measurement information. In some aspects, the request from the source MN may indicate a maximum number of candidate target PSCells to the target MN. In some aspects, the request for the conditional handover indicates one or more of: a proposed set of PSCells based on UE measurement information provided by the source MN in the request for the conditional handover, a source secondary node identifier, or a source SCG configuration. FIG. 4 illustrates an example of a conditional handover. The reception may be performed, e.g., by the component 199, the transceiver 1046, and/or the antennas 1080, for example.

At 704, the target MN indicates, to the source MN, multiple candidate target PSCells associated with the candidate target PCell for the conditional handover. The indication may be performed, e.g., by the component 199, the transceiver 1046, and/or the antennas 1080, for example.

FIG. 7B is a flowchart 750 of a method of wireless communication. The method may be performed by a network node (e.g., the base station 102, 310; the target MN 406; the network entity 1002). Aspects that are similar to FIG. 7A are illustrated with a same reference number. FIG. 7B illustrates that, in some aspects, the target MN may further transmit, to one or more candidate target secondary nodes, an additional request associated with the conditional handover, at 701. The transmission may be performed, e.g., by the component 199, the transceiver 1046, and/or the antennas 1080, for example. In some aspects, the request for the conditional handover may indicate one or more of: a proposed set of PSCells based on the UE measurement information provided by the source MN in the request for the conditional handover, a source secondary node identifier, or a source SCG configuration.

Figure 8:
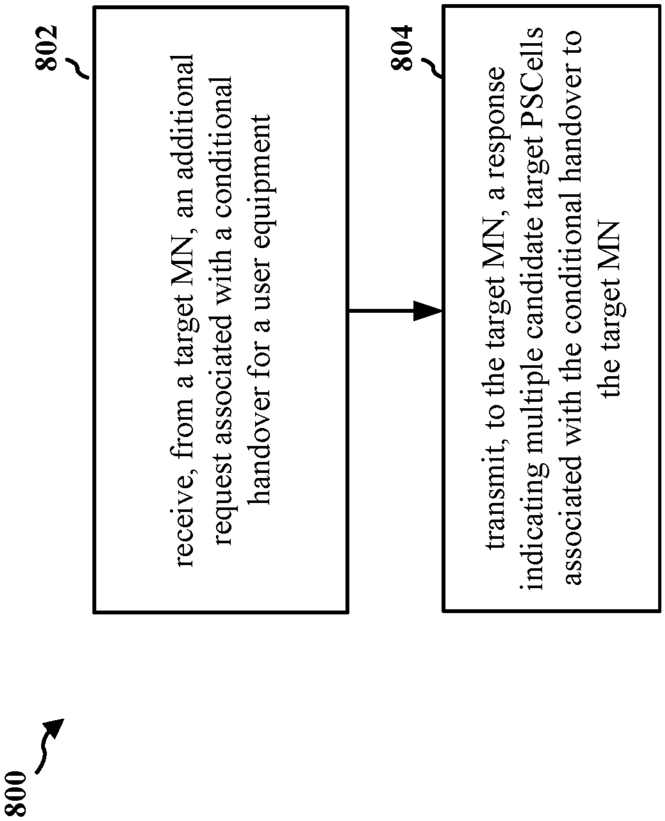
FIG. 8 is a flowchart of a method of wireless communication at a target SN in accordance with various aspects of the present disclosure.

At 703, the target MN may receive a response from at least one of the one or more candidate target secondary nodes. The multiple candidate target PSCells indicated to the source MN, at 704, may be based on the response from the at least one of the one or more candidate target secondary nodes. In some aspects, the response may include one or more of: a set of candidate target PSCells associated with the target MN, or a target secondary cell group (SCG) configuration associated with each PSCell in the set of the candidate target PSCells. The reception may be performed, e.g., by the component 199, the transceiver 1046, and/or the antennas 1080, for example. In some aspects, the response may include one or more of: a set of candidate target PSCells associated with the target MN, or a target SCG configuration associated with each PSCell in the set of the candidate target PSCells FIG. 8 is a flowchart 800 of a method of wireless communication. The method may be performed by a network node (e.g., the base station 102, 310; the target SN 408; the network entity 1002). The method may help to improve mobility for a UE served by a wireless network by configuring multiple candidate PSCells for a UE, which increases the likelihood that a UE will be able to access a candidate PSCell with a good radio link quality upon executing a CHO. Therefore, the method may help to provide continuity of service and improve communication between a UE and a network.

At 802, the target SN receives, from a target MN, an additional request associated with a conditional handover for a user equipment. In some aspects, the request indicates one or more of: a proposed set of PSCells, a source secondary node identifier, or a source SCG configuration. FIG. 4 illustrates various aspects associated with a conditional handover. The reception may be performed, e.g., by the component 199, the transceiver 1046, and/or the antennas 1080, for example.

At 804, the target SN transmits, to the target MN, a response indicating multiple candidate target PSCells associated with the conditional handover to the target MN. In some aspects, the response includes one or more of: a set of candidate target PSCells associated with the target MN, or a target SCG configuration associated with each PSCell in the set of the candidate target PSCells. The transmission may be performed, e.g., by the component 199, the transceiver 1046, and/or the antennas 1080, for example.

Figure 9:
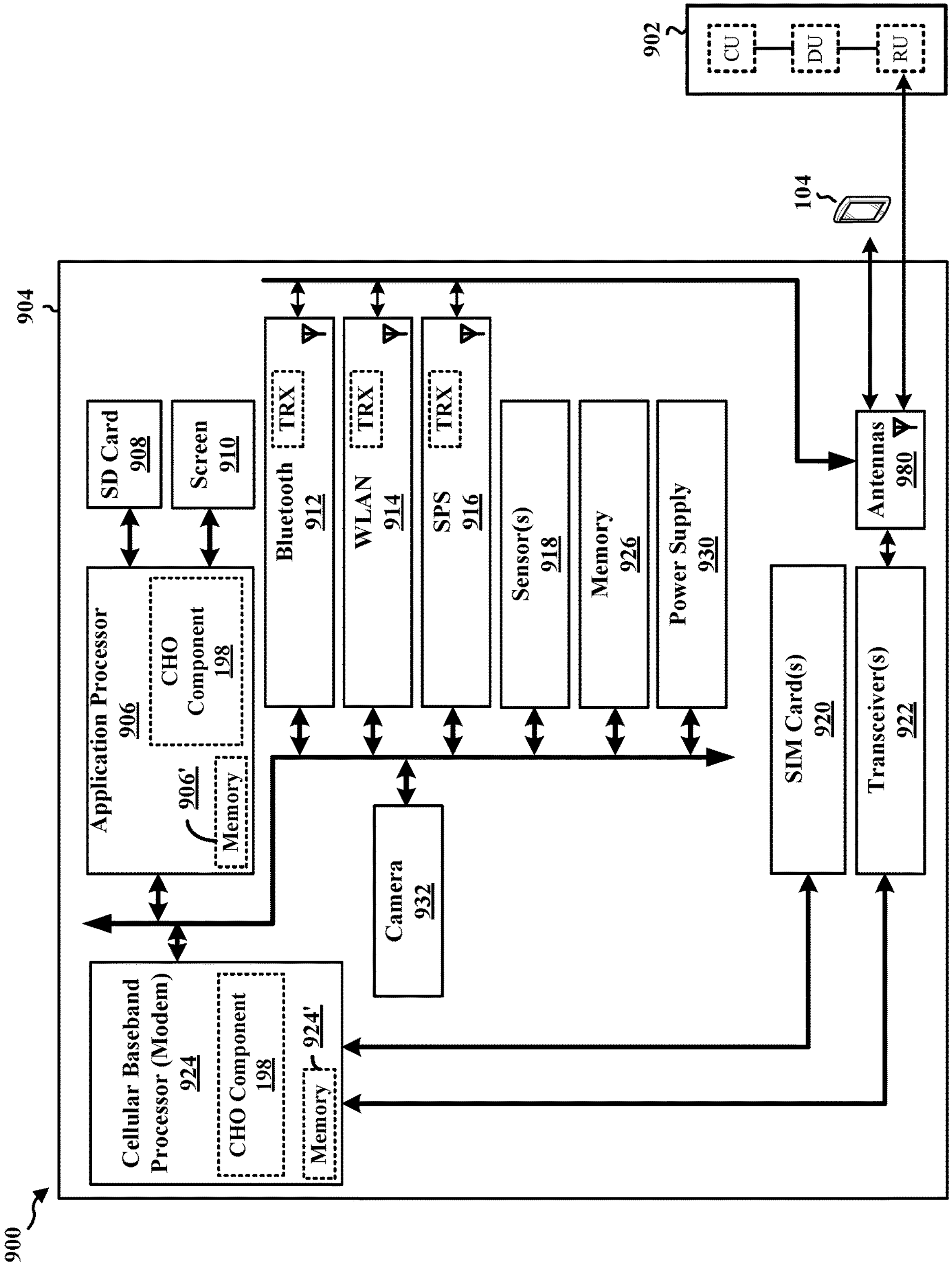
FIG. 9 is a diagram illustrating an example of a hardware implementation for an example apparatus and/or UE.

FIG. 9 is a diagram 900 illustrating an example of a hardware implementation for an apparatus 904. The apparatus 904 may be a UE, a component of a UE, or may implement UE functionality. In some aspects, the apparatus 904 may include at least one cellular baseband processor 924 (or processor circuitry) (also referred to as a modem) coupled to one or more transceivers 922 (e.g., cellular RF transceiver). The cellular baseband processor 924 may include at least one on-chip memory 924' (or memory circuitry). In some aspects, the apparatus 904 may further include one or more subscriber identity modules (SIM) cards 920 and at least one application processor 906 (or processor circuitry) coupled to a secure digital (SD) card 908 and a screen 910. The application processor 906 may include on-chip memory 906' (or memory circuitry). In some aspects, the apparatus 904 may further include a Bluetooth module 912, a WLAN module 914, an SPS module 916 (e.g., GNSS module), one or more sensor modules 918 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor 924 communicates through the transceiver(s) 922 via one or more antennas 980 with the UE 104 and/or with an RU associated with a network entity 902. The cellular baseband processor 924 and the application processor 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor 924 and the application processor 906 are each responsible for general processing, including the execution of software stored on the computer-readable medium/memory. The software, when executed by the cellular baseband processor 924/application processor 906, causes the cellular baseband processor 924/application processor 906 to perform the various functions described supra. The cellular baseband processor(s) 924 and the application processor(s) 906 are configured to perform the various functions described supra based at least in part of the information stored in the memory. That is, the cellular baseband processor(s) 924 and the application processor(s) 906 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor 924/application processor 906 when executing software. The cellular baseband processor 924/application processor 906 may be a component of the UE 350 and may include the memory 360 and/or at least one of the TX processor 368, the RX processor 356, and the controller/processor 359. In one configuration, the apparatus 904 may be a processor chip (modem and/or application) and include just the cellular baseband processor 924 and/or the application processor 906, and in another configuration, the apparatus 904 may be the entire UE (e.g., see 350 of FIG. 3) and include the additional modules of the apparatus 904.

As discussed supra, the CHO component 198 is configured to receive a conditional handover configuration for a handover to one of multiple candidate target PCells, the conditional handover configuration including multiple candidate target PSCells associated with each candidate target PCell in the conditional handover configuration; perform, in response to a conditional handover execution condition being satisfied, a conditional handover from a source PCell to a target PCell from the multiple candidate target PCells; select a PSCell from the multiple candidate target PSCells configured in the conditional handover configuration for the target PCell, based on a PSCell selection execution condition; and communicate with a network on the target PCell and the selected PSCell. The CHO component 198 may be configured to perform any of the aspects described in connection with FIG. 5, and/or any of the aspects performed by the UE in FIG. 4. The component 198 may be within the cellular baseband processor 924, the application processor 906, or both the cellular baseband processor 924 and the application processor 906. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 904 may include a variety of components configured for various functions. In one configuration, the apparatus 904, and in particular the cellular baseband processor 924 and/or the application processor 906, includes means for receiving a conditional handover configuration for a handover to one of multiple candidate target PCells and including multiple candidate target PSCells associated with each candidate target PCell in the conditional handover configuration; means for performing, in response to a conditional handover execution condition is satisfied, a conditional handover from a source PCell to a target PCell from the multiple candidate target PCells; means for selecting a PSCell from the multiple candidate target PSCells configured in the conditional handover configuration for the target PCell, based on a PSCell selection execution condition; and means for communicating with a network on the target PCell and the selected PSCell. The apparatus 904 may further include means for performing any of the aspects described in connection with FIG. 5, and/or any of the aspects performed by the UE in FIG. 4. The means may be the component 198 of the apparatus 904 configured to perform the functions recited by the means. As described supra, the apparatus 904 may include the TX processor 368, the RX processor 356, and the controller/processor 359. As such, in one configuration, the means may be the TX processor 368, the RX processor 356, and/or the controller/processor 359 configured to perform the functions recited by the means.

Figure 10:
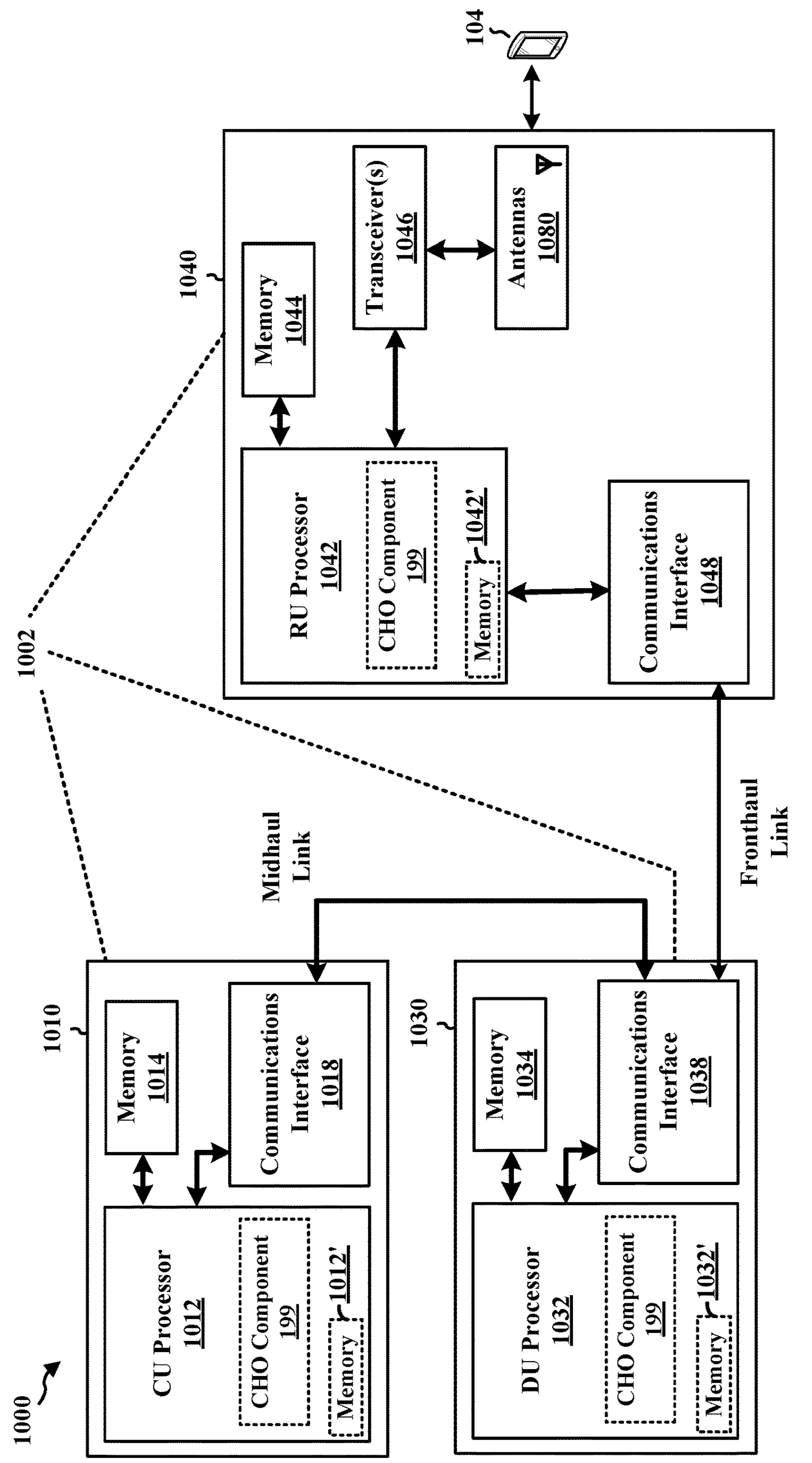
FIG. 10 is a diagram illustrating an example of a hardware implementation for an example network entity.

FIG. 10 is a diagram 1000 illustrating an example of a hardware implementation for a network entity 1002. The network entity 1002 may be a BS, a component of a BS, or may implement BS functionality. The network entity 1002 may include at least one of a CU 1010, a DU 1030, or an RU 1040. For example, depending on the layer functionality handled by the component 199, the network entity 1002 may include the CU 1010; both the CU 1010 and the DU 1030; each of the CU 1010, the DU 1030, and the RU 1040; the DU 1030; both the DU 1030 and the RU 1040; or the RU 1040. The CU 1010 may include at least one CU processor 1012 (or processor circuitry). The CU processor 1012 may include on-chip memory 1012' (or memory circuitry). In some aspects, the CU 1010 may further include additional memory modules 1014 and a communications interface 1018. The CU 1010 communicates with the DU 1030 through a midhaul link, such as an Fl interface. The DU 1030 may include at least one DU processor 1032 (or processor circuitry). The DU processor 1032 may include on-chip memory 1032' (or memory circuitry). In some aspects, the DU 1030 may further include additional memory modules 1034 and a communications interface 1038. The DU 1030 communicates with the RU 1040 through a fronthaul link. The RU 1040 may include at least one RU processor 1042 (or processor circuitry). The RU processor 1042 may include on-chip memory 1042' (or memory circuitry). In some aspects, the RU 1040 may further include additional memory modules 1044, one or more transceivers 1046, antennas 1080, and a communications interface 1048. The RU 1040 communicates with the UE 104. The on-chip memory 1012', 1032', 1042' and the additional memory modules 1014, 1034, 1044 may each be considered a computer-readable medium/memory. Each computer-readable medium/memory may be non-transitory. Each of the processors 1012, 1032, 1042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the CHO component 199 may be configured to, e.g., when the network entity is operating at a source MN, provide a request for a conditional handover to at least one target MN including UE measurement information; receive, from each of the at least one target MN, a response indicating multiple candidate target PSCells associated with a candidate target PCell; and configure a UE with a conditional handover configuration for a handover to one of multiple candidate target PCells and including the multiple candidate target PSCells associated with each candidate target PCell in the conditional handover configuration. The CHO component 199 may be further configured to perform any of the aspects described in connection with the flowchart in FIG. 6 and/or the aspects performed by the source MN in FIG. 4. The CHO component may be configured to, e.g., when the network entity is operating as a target MN, receive, from a source MN, a request associated with a conditional handover, the request identifying a candidate target PCell and including UE measurement information; and indicate, to the source MN, multiple candidate target PSCells associated with the candidate target PCell for the conditional handover. The CHO component may be further configured to perform any of the aspects described in connection with FIG. 7A or 7B, and/or performed by the target MN in FIG. 4. The CHO component 199 may be configured to, e.g., when the network entity is operating as a target SN, receive, from a target MN, an additional request associated with a conditional handover for a user equipment; and transmit, to the target MN, a response indicating multiple candidate target PSCells associated with the conditional handover to the target MN. The CHO component may be further configured to perform any of the aspects described in connection with FIG. 8, and/or performed by the target SN in FIG. 4. The component 199 may be within one or more processors of one or more of the CU 1010, DU 1030, and the RU 1040. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1002 may include a variety of components configured for various functions. In one configuration, the network entity 1002 includes means for performing any of the aspects described in connection with the flowcharts of FIGS. 6, 7, and/or 8, and/or described in connection with the source MN, target MN, and/or target SN in FIG. 4. At times a network entity may operate as a source MN. At other times, a network entity may operate as a target MN. At other times, the network entity may operate as a target SN. For example, if the network entity is operating as a source MN, and may include means for providing a request for a conditional handover to at least one target MN including UE measurement information; means for receiving, from each of the at least one target MN, a response indicating multiple candidate target PSCells associated with a candidate target PCell; and means for configuring a UE with a conditional handover configuration for a handover to one of multiple candidate target PCells and including the multiple candidate target PSCells associated with each candidate target PCell in the conditional handover configuration. In some aspects, the network entity may operate as a target MN, and may include means for receiving, from a source MN, a request associated with a conditional handover, the request identifying a candidate target PCell and including UE measurement information; and means for indicating, to the source MN, multiple candidate target PSCells associated with the candidate target PCell for the conditional handover. In some aspects, the network entity may further include means for transmitting, to one or more candidate target secondary nodes, an additional request associated with the conditional handover; and means for receiving a response from at least one of the one or more candidate target secondary nodes, the multiple candidate target PSCells indicated to the source MN being based on the response from the at least one of the one or more candidate target secondary nodes. In some aspects, the network entity may operate as a target secondary node, and may include means for receiving, from a target MN, an additional request associated with a conditional handover for a user equipment; and means for transmitting, to the target MN, a response indicating multiple candidate target PSCells associated with the conditional handover to the target MN. The means may be the component 199 of the network entity 1002 configured to perform the functions recited by the means. As described supra, the network entity 1002 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions.

Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising: receiving a conditional handover configuration for a handover to one of multiple candidate target PCells, the conditional handover configuration including multiple candidate target PSCells associated with each candidate target PCell in the conditional handover configuration; performing, in response to a conditional handover execution condition being satisfied, a conditional handover from a source PCell to a target PCell from the multiple candidate target PCells; selecting a PSCell from the multiple candidate target PSCells configured in the conditional handover configuration for the target PCell, based on a PSCell selection execution condition; and communicating with a network on the target PCell and the selected PSCell.

In aspect 2, the method of aspect 1 further includes that the conditional handover configuration is comprised in a radio resource control message and indicates one or more of: the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for an MCG and a SCG for each combination of a candidate target PCell and candidate target PSCell, or any combination thereof.

In aspect 3, the method of aspect 2 further includes that the conditional handover configuration includes: a measurement configuration from a source MN, wherein each corresponding PSCell selection execution condition is indicated with a measurement ID associated with the measurement configuration from the source MN.

In aspect 4, the method of any of aspects 1-3 further includes simultaneously initiating evaluation of conditional handover execution conditions and PSCell selection execution conditions.

In aspect 5, the method of aspect 4 further includes accessing the target PCell and the selected PSCell simultaneously in response to the conditional handover execution condition being satisfied simultaneously with the PSCell selection execution condition; accessing, in response to the conditional handover execution condition being satisfied, the target PCell while continuing to evaluate the PSCell selection execution conditions for candidate target PSCells associated with the target PCell; or remaining, after the PSCell selection execution condition is satisfied, on the source PCell until the conditional handover execution condition is satisfied.

In aspect 6, the method of any of aspects 1-3 further includes initiating a conditional handover execution condition evaluation prior to a PSCell selection execution condition evaluation.

In aspect 7, the method of aspect 6 further includes initiating the PSCell selection execution condition evaluation in response to completion of a fraction of a TTT corresponding to a continuous period of time during which the conditional handover execution condition is to be met for the conditional handover to occur.

In aspect 8, the method of aspect 7 further includes that the conditional handover configuration indicates the fraction of the TTT.

In aspect 9, the method of aspect 7 further includes that the fraction of the TTT is selected by the UE.

Aspect 10 is an apparatus for wireless communication at a UE, comprising: at least one memory; and at least one processor coupled to the at least one memory and, based at least in part on information stored in the at least one memory, the at least one processor, individually or in any combination, is configured to cause the UE perform the method of any of aspects 1-9.

Aspect 11 is an apparatus for wireless communication at a UE, comprising means for performing each step in the method of any of aspects 1-9.

Aspect 12 is the apparatus of any of aspects 10 to 11, further comprising a transceiver configured to receive or to transmit in association with the method of any of aspects 1-9.

Aspect 13 is a computer-readable medium storing computer executable code at a UE, the code when executed by at least one processor causes the UE to perform the method of any of aspects 1-9.

Aspect 14 is a method of wireless communication at a source MN, comprising: providing a request for a conditional handover to at least one target MN including UE measurement information; receiving, from each of the at least one target MN, a response indicating multiple candidate target PSCells associated with a candidate target PCell; and configuring a UE with a conditional handover configuration for a handover to one of multiple candidate target PCells and including the multiple candidate target PSCells associated with each candidate target PCell in the conditional handover configuration.

In aspect 15, the method of aspect 14 further includes that the conditional handover configuration is comprised in a RRC message and indicates one or more of: the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for a MCG and a SCG for each combination of a candidate target PCell and candidate target PSCell, or any combination thereof.

In aspect 16, the method of aspect 15 further includes that the conditional handover configuration includes: a measurement configuration from the source MN, wherein each corresponding PSCell selection execution condition is indicated with a measurement ID associated with the measurement configuration from the source MN.

In aspect 17, the method of any of aspects 14-16 further includes that the request from the source MN further indicates a maximum number of candidate target PSCells for each of the at least one target MN.

Aspect 18 is an apparatus for wireless communication at a source MN, comprising: at least one memory; and at least one processor coupled to the at least one memory and, based at least in part on information stored in the at least one memory, the at least one processor, individually or in any combination, is configured to cause the source MN to perform the method of any of aspects 14-17.

Aspect 19 is an apparatus for wireless communication at a source MN, comprising means for performing each step in the method of any of aspects 14-17.

Aspect 20 is the apparatus of any of aspects 18 or 19 further comprising a transceiver configured to receive or to transmit in association with the method of any of aspects 14-17.

Aspect 21 is a computer-readable medium storing computer executable code at a source MN, the code when executed by at least one processor causes the source MN to perform the method of any of aspects 14-17.

Aspect 22 is a method of wireless communication at a target MN, comprising: receiving, from a source MN, a request associated with a conditional handover, the request identifying a candidate target PCell and including UE measurement information; and indicating, to the source MN, multiple candidate target PSCells associated with the candidate target PCell for the conditional handover.

In aspect 23, the method of aspect 22 further includes that the request from the source MN indicates a maximum number of candidate target PSCells to the target MN.

In aspect 24, the method of aspect 22 or 23 further includes transmitting, to one or more candidate target secondary nodes, an additional request associated with the conditional handover; and receiving a response from at least one of the one or more candidate target secondary nodes, the multiple candidate target PSCells indicated to the source MN being based on the response from the at least one of the one or more candidate target secondary nodes.

In aspect 25, the method of aspect 24 further includes that the request for the conditional handover indicates one or more of: a proposed set of PSCells based on the UE measurement information provided by the source MN in the request for the conditional handover, a source secondary node identifier, or a source SCG configuration.

In aspect 26, the method of aspect 24 or 25 further includes that the response includes one or more of: a set of candidate target PSCells associated with the target MN, or a target SCG configuration associated with each PSCell in the set of the candidate target PSCells.

Aspect 27 is an apparatus for wireless communication at a target MN, comprising: at least one memory; and at least one processor coupled to the at least one memory and, based at least in part on information stored in the at least one memory, the at least one processor, individually or in any combination, is configured to cause the target MN to perform the method of any of aspects 22-26.

Aspect 28 is an apparatus for wireless communication at a target MN, comprising means for performing each step in the method of any of aspects 22-26.

Aspect 29 is the apparatus of any of aspects 27 or 28 further comprising a transceiver configured to receive or to transmit in association with the method of any of aspects 22-26.

Aspect 30 is a computer-readable medium storing computer executable code at a target MN, the code when executed by at least one processor causes the target MN to perform the method of any of aspects 22-26.

Aspect 31 is a method of wireless communication at a target SN, comprising: receiving, from a target MN, an additional request associated with a conditional handover for a user equipment; and transmitting, to the target MN, a response indicating multiple candidate target PSCells associated with the conditional handover to the target MN.

In aspect 32, the method of aspect 30 further includes that the request indicates one or more of: a proposed set of PSCells, a source secondary node identifier, or a source SCG configuration.

In aspect 33, the method of aspect 30 or 31 further includes that the response includes one or more of: a set of candidate target PSCells associated with the target MN, or a target SCG configuration associated with each PSCell in the set of the candidate target PSCells.

Aspect 34 is an apparatus for wireless communication at a target SN, comprising: at least one memory; and at least one processor coupled to the at least one memory and, based at least in part on information stored in the at least one memory, the at least one processor, individually or in any combination, is configured to cause the target SN to perform the method of any of aspects 31-33.

Aspect 35 is an apparatus for wireless communication at a target SN, comprising means for performing each step in the method of any of aspects 31-33.

Aspect 36 is the apparatus of any of aspects 34 or 35 further comprising a transceiver configured to receive or to transmit in association with the method of any of aspects 31-33.

Aspect 37 is a computer-readable medium (e.g., non-transitory computer-readable medium) storing computer executable code at a target SN, the code when executed by at least one processor causes the target SN to perform the method of any of aspects 31-33.

What is claimed is:

1. An apparatus for wireless communication at a user equipment (UE), comprising:

at least one memory; and at least one processor coupled to the at least one memory and, based at least in part on information stored in the at least one memory, the at least one processor is configured to cause the UE to:

receive a conditional handover configuration for a handover to one of multiple candidate target primary cells (PCells), the conditional handover configuration including multiple candidate target primary secondary cells (PSCells) associated with each candidate target PCell in the conditional handover configuration;

access a target PCell and a selected PSCell simultaneously if a conditional handover execution condition is satisfied simultaneously with a PSCell selection execution condition;

access the target PCell while continuing to evaluate PSCell selection execution conditions for candidate target PSCells associated with the target PCell if the conditional handover execution condition is satisfied and the PSCell selection execution condition is not satisfied; and remain on a source PCell until the conditional handover execution condition is satisfied if the PSCell selection execution condition is satisfied and the conditional handover execution condition is not satisfied.

2. The apparatus of claim 1, further comprising:

at least one transceiver coupled to the at least one processor, wherein the conditional handover configuration is comprised in a radio resource control message and indicates one or more of:

the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for a primary cell group (MCG) and a secondary cell group (SCG) for each combination of a candidate target PCell and candidate target PSCell, or a combination thereof.

3. The apparatus of claim 2, wherein the conditional handover configuration includes:

a measurement configuration from a source primary node (MN), wherein each corresponding PSCell selection execution condition is indicated with a measurement identifier (ID) associated with the measurement configuration from the source MN.

4. The apparatus of claim 1, wherein the at least one processor is further configured to cause the UE to:

simultaneously initiate evaluation of conditional handover execution conditions and the PSCell selection execution conditions.

5. The apparatus of claim 1, wherein the at least one processor is further configured to cause the UE to:

select, based on the conditional handover from the source PCell to the target PCell, a PSCell from the multiple candidate target PSCells configured in the conditional handover configuration for the target PCell, based on the PSCell selection execution condition; and communicate with a network on the target PCell and the selected PSCell.

6. The apparatus of claim 1, further comprising at least one transceiver coupled to the at least one processor, wherein the at least one processor is configured to cause the UE to transmit or receive via the at least one transceiver.

7. An apparatus for wireless communication at a user equipment (UE), comprising:

at least one memory; and at least one processor coupled to the at least one memory and, based at least in part on information stored in the at least one memory, the at least one processor is configured to cause the UE to:

receive a conditional handover configuration for a handover to one of multiple candidate target primary cells (PCells), the conditional handover configuration including multiple candidate target primary secondary cells (PSCells) associated with each candidate target PCell in the conditional handover configuration;

initiate a conditional handover execution condition evaluation prior to a PSCell selection execution condition evaluation;

initiate the PSCell selection execution condition evaluation in response to completion of a fraction of a time to trigger (TTT) corresponding to a continuous period of time during which the conditional handover execution condition is to be met for the conditional handover to occur;

perform, in response to a conditional handover execution condition being satisfied, a conditional handover from a source PCell to a target PCell from the multiple candidate target PCells;

select a PSCell from the multiple candidate target PSCells configured in the conditional handover configuration for the target PCell, based on a PSCell selection execution condition; and communicate with a network on the target PCell and the selected PSCell.

8. The apparatus of claim 7, wherein the conditional handover configuration indicates the fraction of the TTT.

9. The apparatus of claim 7, wherein the fraction of the TTT is selected by the UE.

10. The apparatus of claim 7, wherein the conditional handover configuration is comprised in a radio resource control message and indicates one or more of:

the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for a primary cell group (MCG) and a secondary cell group (SCG) for each combination of a candidate target PCell and candidate target PSCell, or a combination thereof.

11. The apparatus of claim 10, wherein the conditional handover configuration includes:

a measurement configuration from a source primary node (MN), wherein each corresponding PSCell selection execution condition is indicated with a measurement identifier (ID) associated with the measurement configuration from the source MN.

12. The apparatus of claim 7, further comprising at least one transceiver coupled to the at least one processor, wherein the at least one processor is configured to cause the UE to transmit or receive via the at least one transceiver.

13. A method of wireless communication at a user equipment (UE), comprising:

receiving a conditional handover configuration for a handover to one of multiple candidate target primary cells (PCells), the conditional handover configuration including multiple candidate target primary secondary cells (PSCells) associated with each candidate target PCell in the conditional handover configuration;

accessing a target PCell and a selected PSCell simultaneously if a conditional handover execution condition is satisfied simultaneously with a PSCell selection execution condition;

accessing the target PCell while continuing to evaluate PSCell selection execution conditions for candidate target PSCells associated with the target PCell if the conditional handover execution condition is satisfied and the PSCell selection execution condition is not satisfied; and remaining on a source PCell until the conditional handover execution condition is satisfied if the PSCell selection execution condition is satisfied and the conditional handover execution condition is not satisfied.

14. The method of claim 13, wherein the conditional handover configuration is comprised in a radio resource control message and indicates one or more of:

the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for a primary cell group (MCG) and a secondary cell group (SCG) for each combination of a candidate target PCell and candidate target PSCell, or a combination thereof.

15. The method of claim 14, wherein the conditional handover configuration includes:

a measurement configuration from a source primary node (MN), wherein each corresponding PSCell selection execution condition is indicated with a measurement identifier (ID) associated with the measurement configuration from the source MN.

16. The method of claim 13, further comprising:

simultaneously initiating evaluation of conditional handover execution conditions and the PSCell selection execution conditions.

17. The method of claim 13, further comprising:

selecting, based on the conditional handover from the source PCell to the target PCell, a PSCell from the multiple candidate target PSCells configured in the conditional handover configuration for the target PCell, based on the PSCell selection execution condition; and communicating with a network on the target PCell and the selected PSCell.

18. A method of wireless communication at a user equipment (UE), comprising:

receiving a conditional handover configuration for a handover to one of multiple candidate target primary cells (PCells), the conditional handover configuration including multiple candidate target primary secondary cells (PSCells) associated with each candidate target PCell in the conditional handover configuration;

initiating a conditional handover execution condition evaluation prior to a PSCell selection execution condition evaluation;

initiating the PSCell selection execution condition evaluation in response to completion of a fraction of a time to trigger (TTT) corresponding to a continuous period of time during which the conditional handover execution condition is to be met for the conditional handover to occur;

performing, in response to a conditional handover execution condition being satisfied, a conditional handover from a source PCell to a target PCell from the multiple candidate target PCells;

selecting a PSCell from the multiple candidate target PSCells configured in the conditional handover configuration for the target PCell, based on a PSCell selection execution condition; and communicating with a network on the target PCell and the selected PSCell.

19. The method of claim 18, wherein the conditional handover configuration indicates the fraction of the TTT.

20. The method of claim 18, wherein the fraction of the TTT is selected by the UE.

21. The method of claim 18, wherein the conditional handover configuration is comprised in a radio resource control message and indicates one or more of:

the multiple candidate target PCells, a corresponding conditional handover execution condition for each of the multiple candidate target PCells, a set of the multiple candidate target PSCells for each of the multiple candidate target PCells, a corresponding PSCell selection execution condition for each of the multiple candidate target PSCells, a target configuration for a primary cell group (MCG) and a secondary cell group (SCG) for each combination of a candidate target PCell and candidate target PSCell, or a combination thereof.

22. The method of claim 21, wherein the conditional handover configuration includes:

a measurement configuration from a source primary node (MN), wherein each corresponding PSCell selection execution condition is indicated with a measurement identifier (ID) associated with the measurement configuration from the source MN.

23. A non-transitory computer-readable medium storing computer executable code at a user equipment (UE), the code when executed by at least one processor causes the at least one processor to:

receive a conditional handover configuration for a handover to one of multiple candidate target primary cells (PCells), the conditional handover configuration including multiple candidate target primary secondary cells (PSCells) associated with each candidate target PCell in the conditional handover configuration;

access a target PCell and a selected PSCell simultaneously if a conditional handover execution condition is satisfied simultaneously with a PSCell selection execution condition;

access the target PCell while continuing to evaluate PSCell selection execution conditions for candidate target PSCells associated with the target PCell if the conditional handover execution condition is satisfied and the PSCell selection execution condition is not satisfied; and remain on a source PCell until the conditional handover execution condition is satisfied if the PSCell selection execution condition is satisfied and the conditional handover execution condition is not satisfied.

24. The non-transitory computer-readable medium of claim 23, wherein the code when executed by the at least one processor causes the at least one processor to:

simultaneously initiate evaluation of conditional handover execution conditions and the PSCell selection execution conditions.

25. The non-transitory computer-readable medium of claim 23, wherein the code when executed by the at least one processor causes the at least one processor to:

select, based on the conditional handover from the source PCell to the target PCell, a PSCell from the multiple candidate target PSCells configured in the conditional handover configuration for the target PCell, based on the PSCell selection execution condition; and communicate with a network on the target PCell and the selected PSCell.

* * * * *